(12) United States Patent
Nakamura et al.

(10) Patent No.: US 12,486,399 B2
(45) Date of Patent: Dec. 2, 2025

(54) PROTON CONDUCTIVE MATERIAL

(71) Applicants: TOYOTA JIDOSHA KABUSHIKI KAISHA, Toyota (JP); NATIONAL UNIVERSITY CORPORATION HOKKAIDO UNIVERSITY, Sapporo (JP)

(72) Inventors: Naoki Nakamura, Shizuoka-ken (JP); Tamaki Nakano, Sapporo (JP)

(73) Assignees: TOYOTA JIDOSHA KABUSHIKI KAISHA, Toyota (JP); NATIONAL UNIVERSITY CORPORATION HOKKAIDO UNIVERSITY, Sapporo (JP)

(*) Notice: Subject to any disclaimer, the term of this patent is extended or adjusted under 35 U.S.C. 154(b) by 656 days.

(21) Appl. No.: 17/816,736

(22) Filed: Aug. 2, 2022

(65) Prior Publication Data
US 2023/0064406 A1    Mar. 2, 2023

(30) Foreign Application Priority Data
Aug. 4, 2021  (JP) .................. 2021-127876

(51) Int. Cl.
*C08L 81/06*    (2006.01)
*C08L 25/18*    (2006.01)
(Continued)

(52) U.S. Cl.
CPC ............ *C08L 81/06* (2013.01); *C08L 25/18* (2013.01); *C08L 79/02* (2013.01);
(Continued)

(58) Field of Classification Search
CPC ............ H01M 8/1032; H01M 8/1039; H01M 8/0125; H01M 8/0123; H01M 8/1044; H01M 2300/0082
See application file for complete search history.

(56) References Cited

U.S. PATENT DOCUMENTS

2003/0158273 A1    8/2003   Kosako et al.
2006/0263659 A1   11/2006   Cho et al.
(Continued)

FOREIGN PATENT DOCUMENTS

CN    1459135 A    11/2003
CN    1990525 A    7/2007
(Continued)

*Primary Examiner* — Matthew W Van Oudenaren
(74) *Attorney, Agent, or Firm* — Dickinson Wright, PLLC

(57) ABSTRACT

To provide a proton conductive material which has high proton conductivity even under no humidification and does not elute into water. A proton conductive material comprising a proton-source-polymer and a proton-channel-polymer, wherein at least one selected from the group consisting of the proton-source-polymer and the proton-channel-polymer is a polymer containing an aromatic ring, and wherein at least a part of the polymer containing the aromatic ring has a stacked structure formed by π-π interactions, and a proton conductive material comprising a proton-source-cross-linked-polymer, wherein the proton-source-crosslinked-polymer is a polymer having a main skeleton which contains a proton source group and an aromatic ring, and a cross-linked structure which contains a proton channel, and wherein at least a part of the proton-source-crosslinked-polymer has a stacked structure formed by π-π interactions.

3 Claims, 1 Drawing Sheet

(51) Int. Cl.
  *C08L 79/02* (2006.01)
  *H01M 8/1023* (2016.01)
  *H01M 8/1025* (2016.01)
  *H01M 8/1032* (2016.01)
  *H01M 8/1039* (2016.01)
  *H01M 8/1044* (2016.01)

(52) U.S. Cl.
  CPC ....... *H01M 8/1032* (2013.01); *H01M 8/1039* (2013.01); *C08L 2203/20* (2013.01); *C08L 2312/00* (2013.01); *H01M 8/1023* (2013.01); *H01M 8/1025* (2013.01); *H01M 8/1044* (2013.01); *H01M 2300/0082* (2013.01)

(56) References Cited

U.S. PATENT DOCUMENTS

| | | |
|---|---|---|
| 2006/0286422 A1 | 12/2006 | Nakato et al. |
| 2007/0166590 A1 | 7/2007 | Nakano et al. |
| 2012/0321993 A1 | 12/2012 | Emori et al. |
| 2017/0125832 A1 | 5/2017 | Umeda et al. |
| 2019/0109343 A1* | 4/2019 | Noro ..................... C08L 101/12 |
| 2020/0136164 A1 | 4/2020 | Nakamura et al. |

FOREIGN PATENT DOCUMENTS

| | | |
|---|---|---|
| CN | 103081031 A | 5/2013 |
| CN | 106165175 A | 11/2016 |
| EP | 1 713 794 B1 | 5/2014 |
| JP | 2002246041 A | 8/2002 |
| JP | 2003242833 A | 8/2003 |
| JP | 2004335231 A | 11/2004 |
| JP | 2006024552 A | 1/2006 |
| JP | 2006032275 A | 2/2006 |
| JP | 2007179925 A | 7/2007 |
| JP | 2007311311 A | 11/2007 |
| JP | 2008084852 A | 4/2008 |
| JP | 2012124157 A | 6/2012 |
| JP | 2020068130 A | 4/2020 |
| WO | 2015/156228 A1 | 10/2015 |
| WO | 2015/166935 A1 | 11/2015 |
| WO | WO2015166935 * | 11/2015 |
| WO | 2017/183397 A1 | 10/2017 |

* cited by examiner

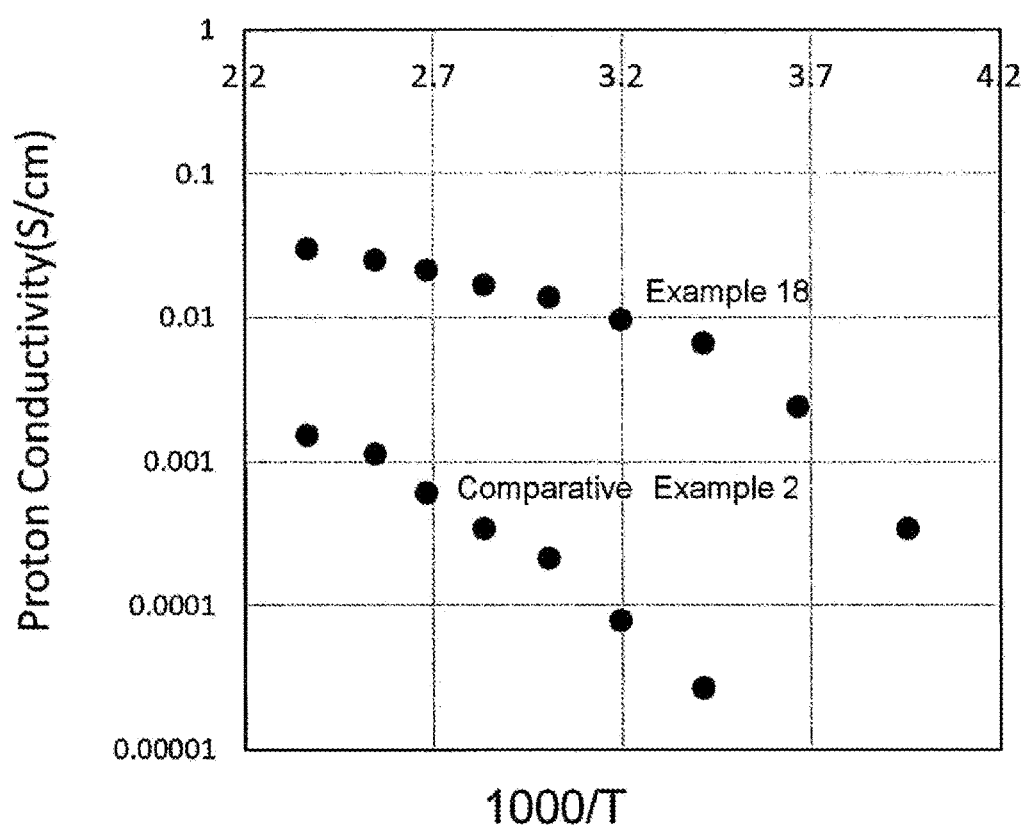

PROTON CONDUCTIVE MATERIAL

TECHNICAL FIELD

The present disclosure relates to a proton conductive material usable as a solid electrolyte membrane or the like in a fuel cell.

BACKGROUND

Conventionally, a perfluorosulfonic acid resin membrane such as Nafion (registered trademark, hereinafter, the same) has been used as a solid electrolyte membrane in a fuel cell. However, in order to realize high proton conductivity in a perfluorosulfonic acid resin membrane, it is necessary to use it at a temperature lower than the boiling point (100° C.) of water because the presence of water is essential. For this reason, in the conventional fuel cell using the perfluorosulfonic acid resin membrane, a humidification system, a temperature control system, or the like for ensuring appropriate moisture is introduced, and the enlargement of the fuel cell device and the increase of the cost have become problems.

From such a situation, recently, there has been an attempt to develop proton conductive materials that can be used under no humidification. As a solid electrolyte membrane usable under no humidification, for example, Patent Literature 1 discloses an electrolyte membrane containing a strong acid such as a phosphoric acid and a basic polymer such as polybenzimidazole.

Patent Literature 2 discloses a proton conductive membrane comprising a block copolymer containing A blocks and B blocks, and a plasticizer which is a hardly volatile acidic substance, wherein the A blocks aggregates with each other to form domains at a use temperature, the B blocks have a proton accepting group, and the B blocks crosslink between the domains.

On the other hand, as described in Patent Literature 3, an ionic conductor composed of an inorganic porous membrane and an ionic liquid held in the inorganic porous membrane is known as an electrolyte membrane that can be used under no humidification.

Patent Literature 1: Japanese Patent Application Laid-Open (JP-A) No. 2006-32275
Patent Literature 2: JP-A No. 2020-68130
Patent Literature 3: JP-A No. 2007-311311

However, when the electrolyte membrane disclosed in Patent Literatures 1, 2 or 3 is used in a fuel cell, there is a problem that the operation of the fuel cell becomes unstable and the power generation performance tends to be lowered, since an acid or an ionic liquid is eluted from the electrolyte membrane by the generated water.

SUMMARY

In light of the above circumstance, an object of the present disclosure is to provide a proton conductive material which has high proton conductivity even under no humidification and does not elute into water.

In a first embodiment, there is provided a proton conductive material comprising a proton source group-containing polymer and a proton channel-containing polymer, wherein at least one selected from the group consisting of the proton source group-containing polymer and the proton channel-containing polymer is a polymer containing an aromatic ring, and wherein at least a part of the polymer containing the aromatic ring has a stacked structure formed by $\pi$-$\pi$ interactions.

In the first embodiment of the proton conductive material, at least one selected from a styrenesulfonic acid-based polymer and a perfluorosulfonic acid-based polymer, may be contained as the proton source group-containing polymer.

In the first embodiment of the proton conductive material, a polymer containing at least one selected from the group consisting of a pyridyl group, a phenanthroline group and a diazadibenzofulvene group may be contained as the proton channel-containing polymer.

In the first embodiment of the proton conductive material, a polyethylene oxide may be further contained as the proton channel-containing polymer.

In a second embodiment, there is provided a proton conductive material comprising a polymer containing a proton source group and a proton channel, wherein the polymer containing a proton source group and a proton channel is a polymer having a main skeleton which contains a proton source group and an aromatic ring, and a crosslinked structure which contains a proton channel, and wherein at least a part of the polymer containing a proton source group and a proton channel has a stacked structure formed by $\pi$-$\pi$ interactions.

According to the present disclosure, it is possible to provide a proton conductive material which has high proton conductivity even under no humidification and does not elute into water.

BRIEF DESCRIPTION OF THE DRAWINGS

In the accompanying drawings,
FIG. 1 is a diagram illustrating proton conductivity at each temperature for the proton conductive membrane of Example 18 and the comparative conductive membrane of Comparative Example 2.

DETAILED DESCRIPTION

The proton conductive material of the first embodiment of the present disclosure is a proton conductive material comprising a proton source group-containing polymer and a proton channel-containing polymer, wherein at least one selected from the group consisting of the proton source group-containing polymer and the proton channel-containing polymer is a polymer containing an aromatic ring, and wherein at least a part of the polymer containing the aromatic ring has a stacked structure formed by $\pi$-$\pi$ interactions.

In the first embodiment of the present disclosure, a proton source group-containing polymer may be referred to as a "proton-source-polymer," and a proton channel-containing polymer may be referred to as a "proton-channel-polymer."

The proton conductive material of the second embodiment of the present disclosure is a proton conductive material comprising a polymer containing a proton source group and a proton channel, wherein the polymer containing a proton source group and a proton channel is a polymer having a main skeleton which contains a proton source group and an aromatic ring, and a crosslinked structure which contains a proton channel, and wherein at least a part of the polymer containing a proton source group and a proton channel has a stacked structure formed by $\pi$-$\pi$ interactions.

In the second embodiment of the present disclosure, a polymer containing a proton source group and a proton channel may be referred to as a "proton-source-crosslinked-polymer."

The proton conductive material of the second embodiment of the present disclosure may further contain a polymer containing no proton source group and containing a proton channel.

In the second embodiment of the present disclosure, a polymer containing no proton source group and containing a proton channel may be referred to as a "proton-channel-polymer."

The proton conductive material of the present disclosure has high proton conductivity under no humidification in both the first and second embodiments described above. Since the proton conductive material of the present disclosure contains a proton source group that releases a proton and contains a proton channel that coordinates the proton, the material exhibits proton conductivity even under no humidity.

In the first embodiment described above, it is presumed that a polymer in which a proton source group or a proton channel is chemically bonded has a stacked structure formed by π-π interactions, thereby forming a crystalline ordered structure in which a proton is easily transferred, and the polymer has a conformation in which a proton conduction passing easily occurs between the proton source group and the proton channel; therefore, the material has high proton conductivity even under no humidification.

In the second embodiment, it is presumed that a polymer which has a main skeleton containing a proton source group and an aromatic ring and a crosslinked structure containing a proton channel, has a stacked structure formed by π-π interactions, thereby forming a crystalline ordered structure in which a proton is easily transferred, and the polymer has a conformation in which a proton conduction passing easily occurs between the proton source group contained in the main skeleton and the proton channel contained in the crosslinked structure; therefore, the material has high proton conductivity even under no humidification.

In addition, in both the first and second embodiments described above, the proton source group and the proton channel does not elute into water because they are chemically bonded to the polymer; therefore, the proton conductive material of the present disclosure does not contain a component eluting into water. When the proton conductive material of the present disclosure is used in a fuel cell or the like, the operation of the fuel cell is unlikely to become unstable because an elution of an acid or the like into the generated water does not occur.

Furthermore, although the electrolyte membranes disclosed in Patent Literatures 1 to 3 can be used under no humidification, the proton conductivity of the electrolyte membranes disclosed in Patent Literatures 1 or 3 tends to decrease in a medium or low temperature range of 100° C. or less, and the electrolyte membrane disclosed in Patent Literature 2 is difficult to be used in a high temperature range due to the low glass transition temperature of the membrane. Hence, when the electrolyte membranes disclosed in Patent Literatures 1 to 3 are used, it is difficult to maintain high proton conductivity in a wide temperature range. In contrast, in a preferred embodiment of the present disclosure, the proton conductive material can have high proton conductivity under no humidification in a wide temperature range. The reason of the high proton conductivity of the material in a wide temperature range is presumed that the structure transition of the polymer due to a temperature change is hardly caused, since the structure of the polymer is stable due to π-π interactions or cross-linked structure. When a proton conductive membrane having high proton conductivity in a wide temperature range under no humidification is used for a fuel cell, a system introduced into the fuel cell device such as a humidification system or a temperature control system can be further simplified or eliminated. Accordingly, a dramatic reduction in cost of the fuel cell device can be realized.

In the present disclosure, the term "under no humidification" means under an environment in which humidity is 5% RH or less.

In the present disclosure, an aromatic ring may be an aromatic hydrocarbon ring or an aromatic heterocycle.

In the present disclosure, the term "A to B" in the numerical range means that the numerical value described as A is included as the lower limit value and the numerical value described as B is included as the upper limit value.

Hereinafter, the first and second embodiments of the proton conductive material of the present disclosure will be described in detail.

First Embodiment

The proton conductive material of the first embodiment of the present disclosure is a proton conductive material comprising a proton-source-polymer and a proton-channel-polymer, wherein at least one selected from the group consisting of the proton-source-polymer and the proton-channel-polymer is a polymer containing an aromatic ring, and wherein at least a part of the polymer containing the aromatic ring has a stacked structure formed by π-π interactions.

In the first embodiment of the present disclosure, the proton-source-polymer and the proton-channel-polymer are different polymers from each other. A proton-source-polymer preferably does not contain a proton channel. A proton-channel-polymer preferably does not contain a proton source group.

(Proton-Source-Polymer)

In the present disclosure, the proton source group is not particularly limited as long as it is a group capable of releasing a proton. Examples of the proton source group include, but are not limited to, a sulfo group ($-SO_3H$), a carboxy group ($-COOH$), a hydroxy group ($-OH$), a thiol group ($-SH$), an imidazole group, and a benzimidazole group. Of these, a sulfo group is preferred from the viewpoint of improving the proton conductivity of the proton conductive material. As a proton source group which tends to form a stacked structure by π-π interactions, for example, a proton source group containing an aromatic ring such as an imidazole group or a benzimidazole group is preferably used.

From the viewpoint of improving the proton conductivity of the proton conductive material, in the proton-source-polymer, the content of the constitutional unit derived from a monomer containing a proton source group is preferably 90 parts by mass or more, and more preferably 95 parts by mass or more, per 100 parts by mass of all constitutional units of the proton-source-polymer. The proton-source-polymer may be a polymer composed of constitutional units each derived from a monomer containing a proton source group.

The proton-source-polymer may be a hydrocarbon-based organic polymer or a perfluoro-based organic polymer. In the present disclosure, the hydrocarbon-based organic polymer may contain a hetero atom, and the perfluoro-based organic polymer may contain a hetero atom other than fluorine.

Regarding the hydrocarbon-based proton-source-polymer, examples of a constitutional unit derived from a monomer containing a proton source group include, but are not limited to, a constitutional unit derived from a monomer such as 4-styrenesulfonic acid, 4-vinylbenzoic acid, 2-vinylbenzoic acid, 4-vinylphenol, 2-vinylphenol, 1-vinylimidazole, 2-vinylimidazole, 4-vinylimidazole, 4-(1H-imidazole-1-yl) styrene, 2-vinyl-1H-benzimidazole, 1-vinyl-1H-benzimidazole, 4-(1H-benzo[d]imidazole-1-yl) styrene, or the like. In the present disclosure, a constitutional unit derived from styrenesulfonic acid includes a unit obtained by polymerizing a salt such as sodium styrenesulfonate and then hydrogenating the salt.

As the hydrocarbon-based proton-source-polymer, a styrenesulfonic acid-based polymer is preferably used from the viewpoint of improving the proton conductivity of the proton conductive material. In the present disclosure, a styrenesulfonic acid-based polymer means a polymer containing a constitutional unit derived from styrenesulfonic acid.

In the styrenesulfonic acid-based polymer, the content of the constitutional unit derived from styrenesulfonic acid is preferably 90 parts by mass or more, and more preferably 95 parts by mass or more, per 100 parts by mass of all constitutional units of the polymer. The styrenesulfonic acid-based polymer may be a polystyrenesulfonic acid composed of constitutional units each derived from styrenesulfonic acid.

When the styrenesulfonic acid-based polymer contains a constitutional unit derived from another monomer other than styrenesulfonic acid. Examples of the other monomer include, but are not limited to, styrene, a substituted styrene having a substituent other than a sulfo group, vinyl fluorene, dibenzofulbene, and 4,5-diazabenzofulbene.

The number average molecular weight Mn of the styrenesulfonic acid-based polymer is not particularly limited. For example, from 4000 to 10000 is preferable, from 5000 to 9000 is more preferable, and from 6000 to 8000 is still more preferable. When the number average molecular weight Mn of the styrenesulfonic acid-based polymer is within the above range, the proton source group tends to be accumulated, and a proton conduction passing tends to occur. Accordingly, the proton conductivity of the proton conductive material tends to be improved.

As a hydrocarbon-based proton-source-polymer which tends to form a stacked structure by π-π interactions, examples include, but are not limited to, hydrocarbon-based proton-source-polymers containing an aromatic ring. Among them, a polymer containing a constitutional unit derived from at least one selected from the group consisting of vinylimidazole, 4-(1H-imidazole-1-yl) styrene and vinylbenzimidazole is preferably used. In the polymer, the content of the constitutional unit derived from vinylimidazole, 4-(1H-imidazole-1-yl)styrene or vinylbenzimidazole is preferably 90 parts by mass or more, more preferably 95 parts by mass or more, and may be 100 parts by mass, per 100 parts by mass of all constitutional units of the polymer.

The number average molecular weight Mn of the hydrocarbon-based proton-source-polymer containing an aromatic ring is not particularly limited. For example, from 1000 to 100,000 is preferable.

The perfluoro-based proton-source-polymer is a polymer which contains a proton source group in a main chain or a side chain and is composed of a perfluorocarbon which may further contain a hetero atom. From the viewpoint of improving the proton conductivity of the proton conductive material, the proton source group is preferably contained in the side chain.

From the viewpoint of improving the proton conductivity of the proton conductive material, as the perfluoro-based proton-source-polymer, a perfluorosulfonic acid-based polymer containing a sulfo group is preferred, a perfluorosulfonic acid-based polymer containing a sulfo group in a side chain is more preferred, and a perfluorosulfonic acid-based polymer having a main chain composed of perfluoroalkylene and a side chain derived from a perfluorovinyl ether substituted with a sulfo group is particularly preferred. Examples of the perfluorosulfonic acid-based polymer include, but are not limited to, Nafion (registered trademark, manufactured by Dupont Co., Ltd.), Aquivion (registered trademark, manufactured by Solvay Co., Ltd.), and the like. Nafion (registered trademark) is a copolymer of tetrafluoroethylene and perfluoro[2-(fluorosulfonylethoxy)propylvinyl ether].

As the proton-source-polymer, at least one selected from the styrenesulfonic acid-based polymer and the perfluorosulfonic acid-based polymer is preferably contained from the viewpoint of easily improving the proton conductivity of the proton conductive material.

When the proton-channel-polymer contained in the proton conductive material does not contain an aromatic ring, as the proton-source-polymer, a proton-source-polymer which tends to form a stacked structure by π-π interactions is preferably contained, and a polymer containing a constitutional unit derived from at least one selected from the group consisting of vinylimidazole, 4-(imidazole-1-yl) styrene and vinylbenzimidazole is more preferably contained.

(Proton-Channel-Polymer)

In the present disclosure, the proton channel is not particularly limited as long as it is a structure capable of coordinating a proton. Examples of the structure serving as the proton channel include, but are not limited to, a pyridyl group, a phenanthroline group, a diazadibenzofluben group, a polyalkylene oxide group, a primary or secondary amino group, an amide group, and an amide bond.

Among them, at least one group selected from the group consisting of a pyridyl group, a phenanthroline group, and a diazadibenzoflubene group is preferable as a proton channel which easily forms a stacked structure by π-π interactions and easily improves proton conductivity of the proton conductive material. Among them, at least one group selected from the group consisting of a 2-pyridyl group, a 1,10-phenanthroline group, and a 4,5-diazadibenzoflubene group is more preferable.

In the present disclosure, a 1,10-phenanthroline group is a group represented by the following chemical formula (1), and a 4,5-diazadibenzofulvene group is a group represented by the following chemical formula (2). In the chemical formulae (1) and (2), * represents a bonding hand.

[Chem. 1]

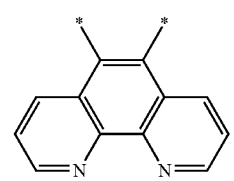

(1)

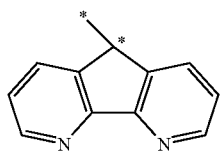

(2)

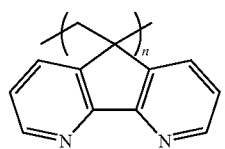

(2')

From the viewpoint of improving the proton conductivity of the proton conductive material, in the proton-channel-polymer, the content of the constitutional unit derived from a monomer containing a proton channel is preferably 90 parts by mass or more, and more preferably 95 parts by mass or more, per 100 parts by mass of all constitutional units of the polymer. The proton-channel-polymer may be a polymer composed of constitutional units each derived from a monomer containing a proton channel.

The proton-channel-polymer may be a hydrocarbon-based organic polymer.

In the proton-channel-polymer, examples of a constitutional unit derived from a monomer containing a proton channel include, but are not limited to, a constitutional unit derived from a monomer such as 2-vinylpyridine, 4-vinylpyridine, polyethylene glycol diacrylate, polyethylene glycol dimethacrylate, and the like, and 1,10-phenanthroline, 4,5-diazadibenzofulvene, and the like.

As a proton-channel-polymer which tends to form a stacked structure by π-π interactions and which tends to improve the proton conductivity of a proton conductive material, a proton-channel-polymer containing an aromatic ring is used, and a polymer containing at least one kind of constitutional unit selected from the group consisting of a constitutional unit derived from 2-vinylpyridine, and 1,10-phenanthroline and 4,5-diazadibenzofulvene is preferably used. Among them, at least one selected from the group consisting of a poly(2-vinylpyridine), a poly(1,10-phenanthroline) and a poly(4,5-diazadibenzofulvene) is preferred. In the poly(2-vinylpyridine), the poly(1,10-phenanthroline) and the poly(4,5-diazadibenzoflubene), each of the content of the constitutional unit derived from 2-vinylpyridine, that of 1,10-phenanthroline and that of 4,5-diazadibenzofulvene is preferably 90 parts by mass or more, more preferably 95 parts by mass or more, and may be 100 parts by mass, per 100 parts by mass of all the constituent units of each of the polymer.

In the case that a poly(2-vinylpyridine), a poly(1,10-phenanthroline) or a poly(4,5-diazadibenzofulbene) contains a constitutional unit derived from other monomer, examples of the other monomer include, but are not limited to, styrene, substituted styrene, vinylfluorene, dibenzofulbene, and 4,5-diazabenzofulbene.

A poly(1,10-phenanthroline) which does not contain the other constitutional unit is a polymer represented by the following chemical formula (1'). A poly(4,5-diazadibenzofulvene) which does not contain the other constitutional unit is a polymer represented by the following chemical formula (2').

[Chem. 2]

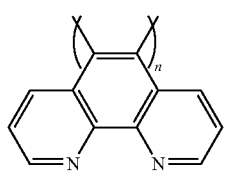

(1')

The number average molecular weight Mn of the poly(2-vinylpyridine) is not limited. For example, from 300 to 3000 is preferable, from 400 to 2500 is more preferable, and from 500 to 2000 is still more preferable. When the number average molecular weight Mn of the poly(2-vinylpyridine) is within the above range, the 2-pyridyl groups tend to be accumulated by π-π interactions, and a proton conduction passing tends to occur. Accordingly, the proton conductivity of the proton conductive material tends to be improved.

The number average molecular weight Mn of the poly(1,10-phenanthroline) is not limited. For example, from 800 to 1300 is more preferable, from 900 to 1100 is still more preferable, and 1000 is particularly preferable, when the styrenesulfonic acid-based polymer is used as the proton-source-polymer. On the other hand, when the perfluorosulfonic acid-based polymer is used as the proton-source-polymer, the number average molecular weight Mn of the poly(1,10-phenanthroline) is preferably from 7000 to 15000, more preferably from 8000 to 13000, still more preferably from 9000 to 11000, and particularly preferably 10000. When the number average molecular weight Mn of the poly(1,10-phenanthroline) is within the above range, the 1,10-phenanthroline groups tend to be accumulated by π-π interactions, and a proton conduction passing tends to occur. Accordingly, the proton conductivity of the proton conductive material tends to be improved.

For example, a poly(1,10-phenanthroline) can be synthesized by referring to W. Yang and T. Nakano, Chem. Commun., 2015, 51, p. 17269 to 17272.

The number average molecular weight Mn of the poly(4,5-diazadibenzofulvene) is preferably from 800 to 2400, more preferably from 1000 to 2000, still more preferably from 1400 to 1800, and particularly preferably 1600. When the number average molecular weight Mn of the poly(4,5-diazadibenzofulvene) is within the above range, the 4,5-diazadibenzofulvene groups tend to be accumulated by π-π interactions, and a proton conduction passing tends to occur. Accordingly, the proton conductivity of the proton conductive material tends to be improved.

For example, a poly(4,5-diazadibenzofulvene) can be synthesized by referring to the 63rd Annual Polymer Congress (Publication No. 1Pa007).

As the proton-channel-polymer, a polyalkylene oxide is also preferred, and a polyethylene oxide is more preferred, from the viewpoint of improving durability of the proton conductive material.

It is preferable that a combination of a polyalkylene oxide and a proton-channel-polymer containing at least one group selected from the group consisting of a pyridyl group, a phenanthroline group and a diazadibenzofulvene group is contained as the proton-channel-polymers, from the viewpoint that the durability of the proton conductive material can be improved while improving the proton conductivity of the material. According to a proton conductive material having improved durability by containing a polyalkylene oxide, a proton conductive membrane excellent in flexibility can be provided, and a large area thin film of a proton conductive membrane can be provided.

When the proton conductive material of the first embodiment of the present disclosure contains, as the proton-source-polymer, a polymer which forms a stacked structure by π-π interactions, only a polyalkylene oxide may be contained as the proton-channel-polymer.

The number average molecular weight Mn of the polyethylene oxide is not particularly limited. For example, from 300 to 600000 is preferable, from 500 to 550000 is more preferable, and from 600 to 510000 is still more preferable. When the number average molecular weight Mn of the polyethylene oxide is equal to or higher than the lower limit value, the polyethylene oxide is excellent in the effect of improving the durability of the proton conductive material. When the number average molecular weight Mn is equal to or lower than the upper limit value, the decrease in the proton conductivity of the proton conductive material is suppressed.

In the first embodiment of the present disclosure, examples of a preferred combination of the proton-source-polymer and the proton-channel-polymer from the viewpoint of particularly high proton conductivity include the followings: a combination of a styrenesulfonic acid-based polymer as the proton-source-polymer and a poly(4,5-diazadibenzofulvene) as the proton-channel-polymer, a combination of a styrenesulfonic acid-based polymer as the proton-source-polymer and a poly(2-vinylpyridine) as the proton-channel-polymer, a combination of a styrenesulfonic acid-based polymer as the proton-source-polymer and a poly(1,10-phenanthroline) having a number average molecular weight Mn of from 900 to 1100 as the proton-channel-polymer, and a combination of a perfluorosulfonic acid-based polymer as the proton-source-polymer and a poly(1,10-phenanthroline) having a number average molecular weight Mn of from 9000 to 11000 as the proton-channel-polymer. Of these, a combination of a styrenesulfonic acid-based polymer as the proton-source-polymer and a poly(4,5-diazadibenzofulvene) as the proton-channel-polymer is preferable from the viewpoint of particularly high proton conductivity pf the proton conductive material under high temperature.

In addition, from the viewpoint of high proton conductivity and excellent durability, a combination further containing a polyethylene oxide as the proton polymer channel in the above-mentioned preferred combination is also preferable. A combination of a styrenesulfonic acid-based polymer as the proton-source-polymer and a poly(4,5-diazadibenzofulvene) and a polyethylene oxide as the proton-channel-polymers is preferable from the viewpoint of particularly high proton conductivity under high temperature, and high proton conductivity and excellent durability.

In the first embodiment of the present disclosure, the mass ratio of the proton-channel-polymer to the proton-source-polymer is appropriately adjusted to improve the proton conductivity of the proton conductive material, depending on the type of each polymer. The mass ratio is not particularly limited. With respect to 100 parts by mass of the proton-source-polymer, the content of the proton-channel-polymer is usually from 1 part by mass to 15 parts by mass, and preferably from 2 parts by mass to 10 parts by mass. When the content of the proton-channel-polymer relative to the proton-source-polymer is within the above range, a conformation in which a proton conduction passing tends to occur between the proton source group and the proton channel. Accordingly, the proton conductivity of the proton conductive material tends to be improved.

In the combination of a styrene sulfonic acid-based polymer as the proton-source-polymer and a poly(4,5-diazadibenzofulvene) as the proton-channel-polymer, the content of the poly(4,5-diazadibenzofulvene) is preferably from 1 part by mass to 15 parts by mass, and more preferably from 3 parts by mass to 10 parts by mass, with respect to 100 parts by mass of the styrene sulfonic acid-based polymer.

In the combination of a styrene sulfonic acid-based polymer as the proton-source-polymer and a polyethylene oxide and a poly(4,5-diazadibenzofulbene) as the proton-channel-polymers, the content of the poly(4,5-diazadibenzofulbene) is preferably from 1 part by mass to 5 parts by mass, more preferably from 2 parts by mass to 4 parts by mass, and still more preferably 3 parts by mass, and the content of the polyethylene oxide is preferably from 8 parts by mass to 12 parts by mass, more preferably from 9 parts by mass to 11 parts by mass, and still more preferably 10 parts by mass, with respect to 100 parts by mass of the styrenesulfonic acid-based polymer.

In the combination of a styrenesulfonic acid-based polymer as the proton-source-polymer and a poly(2-vinylpyridine) as the proton-channel-polymer, the content of the poly(2-vinylpyridine) is preferably from 8 parts by mass to 12 parts by mass, more preferably from 9 parts by mass to 11 parts by mass, and still more preferably 10 parts by mass, with respect to 100 parts by mass of the styrenesulfonic acid-based polymer.

In the combination of a styrenesulfonic acid-based polymer as the proton-source-polymer and a poly(1,10-phenanthroline) having a number average molecular weight Mn of from 900 to 1100 as the proton-channel-polymer, the content of the poly(1,10-phenanthroline) is preferably from 1 part by mass to 5 parts by mass, more preferably from 1 part by mass to 3 parts by mass, and still more preferably 2 parts by mass, with respect to 100 parts by mass of the styrenesulfonic acid-based polymer.

In the combination of a perfluorosulfonic acid-based polymer as the proton-channel-polymer and a poly(1,10-phenanthroline) having a number average molecular weight Mn of from 9000 to 11000 as the proton-channel-polymer, the content of the poly(1,10-phenanthroline) is preferably from 8 parts by mass to 12 parts by mass, more preferably from 9 parts by mass to 11 parts by mass, and still more preferably 10 parts by mass, with respect to 100 parts by mass of the perfluorosulfonic acid-based polymer.

In the combination of at least one selected from a styrenesulfonic acid-based polymer and a perfluorosulfonic acid-based polymer as the proton-source-polymer, and a polyethylene oxide in addition to at least one selected from a poly(2-vinylpyridine) and a poly(1,10-phenanthroline) as the proton-channel-polymers, the content of the polyethylene oxide is preferably from 8 parts by mass to 12 parts by mass, more preferably from 9 parts by mass to 11 parts by mass, and still more preferably 10 parts by mass, with respect to 100 parts by mass of the proton-source-polymer.

(Physical Properties)

In the proton conductive material of the first embodiment of the present disclosure, at least a part of a polymer containing an aromatic ring has a stacked structure formed by π-π interactions.

It can be confirmed, for example, by a $^1$H-NMR spectrum or a UV-absorption spectrum that a polymer contained in a proton conductive material have a stacked structure formed by π-π interactions. Specifically, the method described in T. Nakano and T. Yade, Journal of the American Chemical Society, 2003, 125, p. 15474 to 15484 may be employed.

In the proton conductive material of the first embodiment of the present disclosure, among the above-mentioned proton-source-polymers and proton-channel-polymers, at least one of a proton-source-polymer and a proton-channel-polymer, which contains an aromatic ring and easily forms a stacked structure by π-π interactions, is contained. Accordingly, a proton conductive material having a structure in which at least a part of the polymer containing the aromatic ring is stacked by π-π interactions can be obtained.

In the proton conductive material of the first embodiment of the present disclosure, the proton conductivity in the membrane thickness direction of the proton conductive material formed into a membrane shape can be set to 10 mS/cm or more, preferably 20 mS/cm or more, and more preferably 30 mS/cm or more under no humidification at 25° C.

The form of the proton conductive material of the first embodiment of the present disclosure is not particularly limited. For example, the form of the proton conductive material may be a membrane, that is, the proton conductive material may be a proton conductive membrane. The proton conductive membrane can be used, for example, as a solid electrolyte membrane of a fuel cell.

The membrane thickness of the proton conductive membrane is appropriately adjusted depending on the application. For example, it may be from 0.1 mm to 5.0 mm.

(Production Method)

A production method of the proton conductive material of the first embodiment of the present disclosure is not particularly limited. It may be any method as long as it is a method which can produce the above-mentioned proton conductive material. For example, the proton conductive material of the first embodiment of the present disclosure can be produced by a method including a step of obtaining a mixture liquid containing the proton-source-polymer, the proton-channel-polymer and a solvent, and a step of removing the solvent from the mixture liquid.

The solvent used in the mixture liquid is not particularly limited. It is appropriately selected depending on the type of the polymer. Examples of the solvent include, but are not limited to, water, an organic solvent, and a mixed solvent thereof. The mixture liquid can be obtained, for example, by mixing a solution in which the proton-source-polymer is dissolved in a solvent and a solution in which the proton-channel-polymer is dissolved in a solvent. In this case, it is preferable to select the solvent such that these solutions are uniformly mixed. For example, water, an alcohol, or a mixed solvent thereof can be preferably used. As an alcohol, methanol is typically used.

In the case of making the proton conductive material into a membrane form, the mixture liquid is dried into a membrane form by a drop casting method or the like in a step of removing the solvent, whereby a membrane-like proton conductive material can be produced.

The method of removing the solvent from the mixture liquid is not particularly limited. For example, the solvent may be removed by drying at room temperature or on a hot plate at 60° C. or the like, under an air atmosphere.

Second Embodiment

A proton conductive material of the second embodiment of the present disclosure contains a proton-source-crosslinked-polymer, wherein the proton-source-crosslinked-polymer is a polymer having a main skeleton which contains a proton source group and an aromatic ring, and a crosslinked structure which contains a proton channel, and wherein at least a part of the proton-source-crosslinked-polymer has a stacked structure formed by π-π interactions.

It is presumed that the proton-source-crosslinked-polymer has a three-dimensional structure in which main skeletons that contain a proton source group and an aromatic ring, are crosslinked to each other by a crosslinked structure containing a proton channel, whereby a stacked structure by π-π interactions is easily formed.

The proton conductive material of the second embodiment of the present disclosure has high proton conductivity even under no humidification, as described above. Further, in the proton conductive material of the second embodiment of the present disclosure, excellent durability can be maintained due to the crosslinked structure in the proton-source-crosslinked-polymer. Hence, the proton conductive material of the second embodiment of the present disclosure is also excellent in durability while having high proton conductivity. Since the deterioration over time is suppressed in the proton conductive material of the second embodiment, it is possible to provide a proton conductive membrane capable of maintaining high proton conductivity for a longer time. Further, in the second embodiment of the present disclosure, since the proton conductive material is excellent in flexibility, a large area thin film of the proton conductive membrane can be provided.

(Proton-Source-Crosslinked-Polymer)

The proton-source-crosslinked-polymer used in the second embodiment of the present disclosure is a polymer having a main skeleton which is a polymer skeleton containing a proton source group and an aromatic ring, and a crosslinked structure which contains a proton channel. The proton-source-crosslinked-polymer may be a hydrocarbon-based organic polymer. The proton source group is the same as that of the first embodiment described above. A preferred proton source group in the first embodiment is likewise preferred in the second embodiment.

From the viewpoint of improving the proton conductivity of the proton conductive material, in the proton-source-crosslinked-polymer, the content of the constitutional unit derived from a monomer containing a proton source group is preferably 90 parts by mass or more, and more preferably 95 parts by mass or more, per 100 parts by mass of all constitutional units of the main skeleton. The main skeleton may be a polymer skeleton composed of constitutional units derived from a monomer containing a proton source group.

Further, from the viewpoint that the proton-source-crosslinked-polymer tends to form a stacked structure by π-π interactions and the proton conductivity of the proton conductive material is easily improved, in the proton-source-crosslinked-polymer, the content of the constitutional unit derived from a monomer containing a proton source group and an aromatic ring is preferably 90 parts by mass or more, and more preferably 95 parts by mass or more, per 100 parts by mass of the all constitutional units of the main skeleton. The main skeleton may be a polymer skeleton composed of constitutional units derived from a monomer containing a proton source group and an aromatic ring.

In the second embodiment of the present disclosure, the mass of the main skeleton in the proton-source-crosslinked-polymer and the mass of the crosslinked structure are the mass of the structure derived from the compound forming the main skeleton and the mass of the structure derived from the compound forming the crosslinked structure, respectively. They can be calculated from the mass of each of compounds used for synthesizing the polymer.

In the proton-source-crosslinked-polymer, as the constitutional unit derived from a monomer containing a proton source group and an aromatic ring which is included in the main skeleton, examples include, but are not limited to, a constitutional unit derived from a monomer such as 4-styrene sulfonic acid, 4-vinylbenzoic acid, 2-vinyl benzoic acid, 4-vinyl phenol, 2-vinyl phenol, 1-vinyl imidazole, 2-vinyl imidazole, 4-vinyl imidazole, 4-(1H-imidazole-1-yl) styrene, 2-vinyl-1H-benzimidazole, or 1-vinyl-1H-benzimidazole.

Among them, a main skeleton derived from a styrenesulfonic acid-based polymer is preferred from the viewpoint of easily forming a stacked structure by π-π interactions and easily improving the proton conductivity of the proton conductive material. Regarding the styrene sulfonic acid-based polymer serving as the main skeleton in the second embodiment, preferred embodiments such as the content of the constitutional unit derived from styrenesulfonic acid and the number average molecular weight, are the same as those of the styrenesulfonic acid-based polymer used in the above-mentioned first embodiment.

The crosslinked structure included in the proton-source-crosslinked-polymer is a crosslinked structure containing a proton channel. The crosslinked structure may be formed by a covalent bond or an intermolecular force other than the covalent bond. The crosslinked structure may be formed by a known crosslinking agent. Examples of the intermolecular force other than the covalent bond include, but are not limited to, a van der Waals force, a charge transfer force, a Coulombic force, a hydrophobic bonding force, a hydrogen bonding force, an ionic bonding force, a coordination bonding force, and a combination thereof.

As a structure serving as the proton channel included in the crosslinked structure, examples include those same as the structures serving as the proton channel in the above-mentioned first embodiment. Among them, at least one selected from a primary or a secondary amino group, an amide group and an amide bond is preferred.

The crosslinked structure may be formed by a crosslinking agent containing a proton channel. The crosslinking agent used for forming the crosslinked structure may be any one containing at least one structure serving as a proton channel. From the viewpoint of improving the proton conductivity of the proton conductive material, it is preferable that the crosslinking agent includes two or more structures serving as a proton channel, and it is more preferable that the crosslinking agent includes two structures serving as a proton channel.

The crosslinked structure formed by a covalent bond is not particularly limited. For example, a crosslinked structure formed by a crosslinking agent such as N,N'-methylenebisacrylamide or the like is preferably used.

The crosslinked structure formed by a covalent bond can be formed by copolymerizing a monomer or a macromonomer which forms a main skeleton with a crosslinking agent. The copolymer obtained by the copolymerization may be any of a random copolymer, a block copolymer or a graft copolymer. Of these, a random copolymer is preferred from the viewpoint of improving the proton conductivity of the proton conductive material.

When a water-soluble crosslinking agent such as N,N'-methylenebisacrylamide is used as a crosslinking agent for forming a crosslinked structure, for example, a salt such as sodium styrenesulfonate and a water-soluble crosslinking agent are copolymerized in water and then hydrogenated, whereby a proton-source-crosslinked-polymer in which the crosslinked structure derived from the water-soluble crosslinking agent is introduced into the main skeleton derived from a styrenesulfonic acid-based polymer, can be obtained. Since sodium styrenesulfonate is more polymerizable than styrenesulfonic acid, it is easy to form a main skeleton having a desired molecular weight by performing a polymerization reaction using sodium styrenesulfonate.

Among water-soluble crosslinking agents, N,N'-methylenebisacrylamide is particularly preferred from the viewpoint of easily improving the proton conductivity and the durability of the proton conductive material.

As the cross-linked structure formed by an intermolecular force other than a covalent bond, a crosslinked structure formed by a hydrogen bonding force is preferred. As the crosslinked structure which contains a proton channel and is formed by a hydrogen bonding force, examples include, but are not limited to, a crosslinked structure derived from a diamino compound such as an alkylene diamine containing an alkylene group having 1 to 6 carbon atoms. Examples of the alkylene diamine include, but are not limited to, 1,6-diaminohexane (DAH) and 1,2-diaminoethane (DAE). The crosslinked structure derived from a diamino compound can be formed, for example, by mixing a polymer serving as a main skeleton and a diamino compound in a solution.

The molecular weight of the crosslinking agent used for forming the crosslinked structure is not particularly limited. For example, from the viewpoint of easily improving the proton conductivity and the durability of the proton conductive material, from 30 to 300 is preferable, from 50 to 200 is more preferable, and from 60 to 160 is still more preferable.

It is preferable that the crosslinked structure has proton channels at both ends of a linear alkylene group from the viewpoint of easily improving the proton conductivity and the durability of the proton conductive material.

The linear alkylene group preferably has 1 to 10 carbon atoms, and more preferably has 1 to 6 carbon atoms.

From the viewpoint that a proton conductive material having high proton conductivity and excellent durability can be obtained, as the proton-source-crosslinked-polymer, the following polymers are preferable: a polymer having a main skeleton derived from a styrenesulfonic acid-based polymer and a crosslinked structure derived from N,N'-methylenebisacrylamide, a polymer having a main skeleton derived from a styrenesulfonic acid-based polymer and a crosslinked structure derived from 1,6-diaminohexane, and a polymer having a main skeleton derived from a styrenesulfonic acid-based polymer and a crosslinked structure derived from 1,2-diaminoethane are preferred. Among them, a polymer having a main skeleton derived from a styrene sulfonic acid-based polymer and a crosslinked structure derived from N,N'-methylenebisacrylamide is more preferable from the viewpoint of achieving particularly high proton conductivity in a wide temperature range.

In the proton-source-crosslinked-polymer, the content of the crosslinked structure is appropriately adjusted to improve the proton conductivity of the proton conductive material. For example, the content of the crosslinked structure is usually from 1 part by mass to 15 parts by mass, and preferably from 1 part by mass to 10 parts by mass, with respect to 100 parts by mass of the main skeleton.

When the content of the crosslinked structure containing a proton channel relative to the main skeleton containing a proton source group and an aromatic ring is within the above range, a proton conduction passing tends to easily occur between the proton source group and the proton channel. Accordingly, the proton conductivity tends to be improved.

In the polymer having a main skeleton derived from a styrenesulfonic acid-based polymer and a crosslinked structure derived from N,N'-methylenebisacrylamide, the content of the crosslinked structure is preferably from 1 part by mass to 7 parts by mass, and more preferably from 1 part by mass to 5 parts by mass, with respect to 100 parts by mass of the main skeleton.

In the polymer having a main skeleton derived from a styrenesulfonic acid-based polymer and a crosslinked structure derived from 1,6-diaminohexane, the content of the crosslinked structure is preferably from 1 part by mass to 7 parts by mass, and more preferably from 1 part by mass to 5 parts by mass, with respect to 100 parts by mass of the main skeleton.

In the polymer having a main skeleton derived from a styrenesulfonic acid-based polymer and a crosslinked structure derived from 1,2-diaminoethane, the content of the crosslinked structure is preferably 1 part by mass to 7 parts by mass, and more preferably from 3 parts by mass to 5 parts by mass, with respect to 100 parts by mass of the main skeleton.

(Proton-Channel-Polymer)

The proton conductive material of the second embodiment of the present disclosure may further contain a proton-channel-polymer. The proton-channel-polymer used in the second embodiment preferably contain no proton source group. Examples of the proton-channel-polymer used in the second embodiment include those same as the proton-channel-polymers used in the above-mentioned first embodiment. As the proton-channel-polymer used in the second embodiment, at least one selected from the group consisting of a poly(2-vinylpyridine), a poly(1,10-phenanthroline) and a poly(4,5-diazadibenzofulvene) is preferred, and a poly(4,5-diazadibenzofulvene) is more preferred.

In the second embodiment, the preferred number average molecular weight Mn of each of the poly(2-vinylpyridine), the poly(1,10-phenanthroline) and the poly(4,5-diazadibenzofulvene) is the same as that of the first embodiment described above.

When the proton conductive material of the second embodiment of the present disclosure further contains a proton-channel-polymer, the content of the proton-channel-polymer is usually from 1 part by mass to 10 parts by mass, and preferably from 1 part by mass to 5 parts by mass, with respect to 100 parts by mass of the main skeleton containing a proton source group and an aromatic ring.

(Physical Properties)

The proton conductive material of the second embodiment of the present disclosure has a structure in which at least a part of the proton-source-crosslinked-polymer is stacked by π-π interactions. It can be confirmed by the same method as in the first embodiment described above that the polymer contained in the proton conductive material has a stacked structure formed by π-π interactions.

In the proton conductive material of the second embodiment of the present disclosure, the proton conductivity in the membrane thickness direction of the proton conductive material formed into a membrane shape can be set to 10 mS/cm or more, preferably 20 mS/cm or more, and more preferably 30 mS/cm or more, under no humidification at 25° C.

The form of the proton conductive material of the second embodiment of the present disclosure is the same as that of the first embodiment described above.

(Production Method)

The production method of the proton conductive material of the second embodiment of the present disclosure is not particularly limited. It may be any method as long as it is a method which can produce the above-mentioned proton conductive material.

Examples of the production method of a proton conductive material which contains, as the proton-source-crosslinked-polymer, a polymer which contains a main skeleton containing a proton source group and an aromatic ring and a crosslinked structure containing a proton channel, include the following method: copolymerizing a monomer or a macromonomer forming a main skeleton, and a crosslinking agent, then, obtaining a proton-source-crosslinked-polymer by hydrogenation if needed, and molding the obtained proton-source-crosslinked-polymer into a desired shape.

The copolymerization may be any of random copolymerization, block copolymerization and graft copolymerization. Of these, random copolymerization is preferable from the viewpoint that a proton-source-crosslinked-polymer having high proton conductivity is easily obtained.

Examples of the production method of a proton conductive material which contains, as the proton-source-crosslinked-polymer, a polymer which contains a main skeleton containing a proton source group and an aromatic ring and a crosslinked structure containing a proton channel and formed by an intermolecular force other than a covalent bond, include the following method: adding a crosslinking agent serving as a crosslinked structure into a solution in which a polymer serving as a main skeleton is dissolved, and mixing the solution, thereby obtaining a proton-source-crosslinked-polymer, and preparing a mixture liquid which contains the obtained proton-source-crosslinked-polymer, a proton-channel-polymer if needed, and a solvent, and removing the solvent from the mixture liquid.

Here, the mixture liquid may be a solution in which only a proton-source-crosslinked-polymer is dissolved in a solvent.

The solvent used in the mixture liquid is not particularly limited. It is appropriately selected depending on the type of the polymer or the crosslinking agent. Examples of the solvent includes, but are not limited to, water, an organic solvent, and a mixed solvent thereof. The mixture liquid can be obtained, for example, by mixing a solution in which a proton-source-crosslinked-polymer is dissolved in a solvent and a solution in which a proton-channel-polymer is dissolved in a solvent. In this case, it is preferable to select the solvent such that these solutions are uniformly mixed. For example, water, an alcohol or a mixed solvent thereof can be preferably used. As an alcohol, methanol is typically used.

The method of removing the solvent from the mixture liquid and the method of forming the membrane are the same as those of the production methods of the proton conductive material of the first embodiment described above.

EXAMPLES

Hereinafter, the present disclosure will be described in more detail with reference to Examples. The present disclosure is not limited to the Examples.

The membrane thickness of the proton conductive membrane obtained in each of the Examples and the comparative conductive membrane obtained in each of the Comparative Examples was measured using a micrometer (manufactured by Mitutoyo Corp., model number: CLM1-15QM).

Comparative Example 1

A Solution of a polystyrene sulfonic acid (Mn 7000) was drop-casted on a steel electrode having a diameter of 5 mm to form a membrane, thereby obtaining a comparative conductive membrane of Comparative Example 1 having a membrane thickness shown in Table 1.

Example 1

A water-alcohol solution in which a polystyrene sulfonic acid (Mn 7000) was dissolved and a methanol solution in which a poly(4,5-diazadibenzoflubene) (Mn 1600) was dissolved were mixed in an amount such that the weight ratio of the polystyrene sulfonic acid to the poly(4,5-diazadibenzoflubene) was as shown in Table 1 to obtain a mixed solution. The obtained mixed solution was drop-casted on a steel electrode having a diameter of 5 mm to form a membrane, thereby obtaining a proton conductive membrane of Example 1 having a membrane thickness shown in Table 1.

Examples 2 to 5

Proton conductive membranes of Examples 2 to 5 were obtained in the same manner as in Example 1, except that a proton-channel-polymer shown in Table 1 was used instead of a poly(4,5-diazadibenzofulvene) and that the added amount of the each solution was changed if necessary such that the mass ratio between the polystyrene sulfonic acid and the proton-channel-polymer became the value shown in Table 1.

Comparative Example 2

A Nafion membrane (product name: NR212, manufactured by The Chemours Company, membrane thickness: 0.31 mm) which is a perfluorosulfonic acid resin was used as a comparative conductive membrane of Comparative Example 2.

Example 6

A suspension of Nafion and a water-alcohol solution in which a poly(1,10-phenanthroline) (Mn 10000) was dissolved were mixed in an amount such that the mass ratio between the Nafion and the poly(1,10-phenanthroline) became the value shown in Table 1 to obtain a mixture liquid. Using the obtained mixture liquid, a proton conductive membrane of Example 6 having a membrane thickness shown in Table 1 was obtained by the same method as in Example 1.

Example 7

A water-alcohol solution in which a polystyrenesulfonic acid (Mn 7000) was dissolved, a methanol solution in which a poly(4,5-diazadibenzofulvene) (Mn 1600) was dissolved, and a methanol solution in which a polyethylene oxide (Mn 600) was dissolved were mixed in an amount such that the mass ratio between the polystyrenesulfonic acid, the poly (4,5-diazadibenzofulvene) and the polyethylene oxide became the value shown in Table 2 to obtain a mixture liquid. Using the obtained mixture liquid, a proton conductive membrane of Example 7 having a membrane thickness shown in Table 2 was obtained by the same method as in Example 1.

Examples 8 to 10

Proton conductive membranes of Examples 8 to 10 were obtained in the same manner as in Example 7, except that the polyethylene oxide having a number-average molecular weight shown in Table 2 was used instead of the polyethylene oxide (Mn 600).

Example 11

To a water-alcohol solution in which a polystyrenesulfonic acid (Mn 7000) was dissolved, 1,6-diaminohexane was added in an amount such that the mass ratio between the polystyrenesulfonic acid and the 1,6-diaminohexane became the value shown in Table 3, and mixed to obtain a mixture liquid. Using the obtained mixture liquid, a proton conductive membrane of Example 11 having a membrane thickness shown in Table 3 was obtained by the same method as in Example 1.

Examples 12 to 13

Proton conductive membranes of Examples 12 to 13 were obtained in the same manner as in Example 11, except that the added amount of the 1,6-diaminohexane was changed such that the mass ratio between the polystyrenesulfonic acid and the 1,6-diaminohexane became the value shown in Table 3.

Example 14

A water-alcohol solution in which a polystyrenesulfonic acid (Mn 7000) was dissolved and a methanol solution in which a poly(4,5-diazadibenzofulvene) (Mn 1600) and 1,6-diaminohexane were dissolved, were mixed in an amount such that the mass ratio between the polystyrenesulfonic acid, the poly(4,5-diazadibenzofulvene) and the 1,6-diaminohexane became the value shown in Table 3 to obtain a mixture liquid. Using the obtained mixture liquid, a proton conductive membrane of Example 14 having a membrane thickness shown in Table 3 was obtained by the same method as in Example 1.

Examples 15 to 16

Proton conductive membranes of Examples 15 to 16 were obtained in the same manner as in Examples 12 to 13, except that 1,2-diaminoethane was used instead of 1,6-diaminohexane.

Example 17

A proton conductive membrane of Example 17 was obtained in the same manner as in Example 14, except that 1,2-diaminoethane was used instead of 1,6-diaminohexane.

Example 18

The proton conductive membrane of Example 18 was obtained in the following Scheme 1, wherein the added amount of N,N'-methylenebisacrylamide (MBAR) was 1 part by mass per 100 parts by mass of the polystyrene sulfonic acid.

That is, to an aqueous solution of 2 mol/L (2M) of sodium 4-styrenesulfonate, N,N'-methylenebisacrylamide was added, and further 2,2'-azobis[2-methyl-N-(2-hydroxyethyl) propionamide] was added as a water-soluble initiator, and the mixture was reacted at 86° C., thereby obtaining a random copolymer gel of sodium 4-styrenesulfonate and N,N'-methylenebisacrylamide. The obtained copolymer gel was immersed in 3M aqueous hydrochloric acid solution, and then washed with water and vacuum dried for 24 hours to obtain a proton conductive membrane of Example 18.

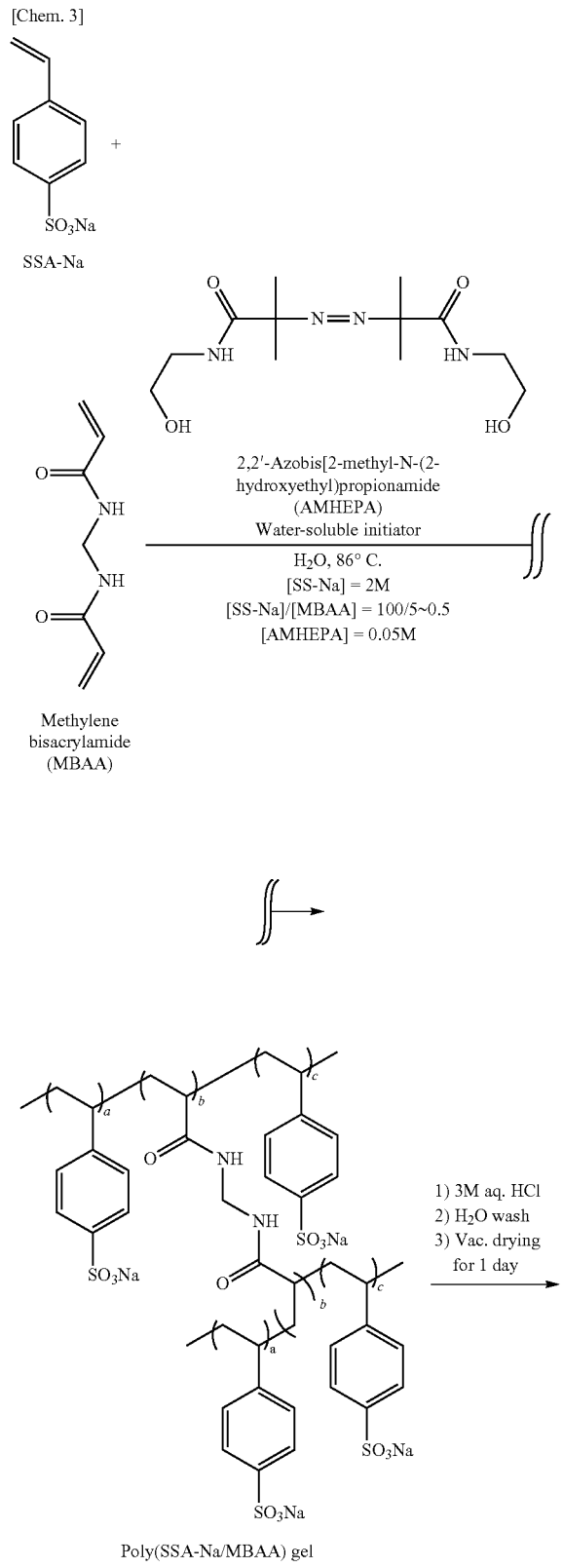

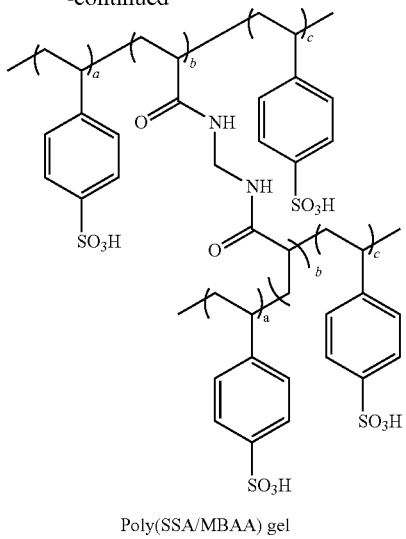

Poly(SSA/MBAA) gel

Example 19

A proton conductive membrane of Example 19 was obtained in the same manner as in Example 18, except that the added amount of N,N'-methylenebisacrylamide was changed to an amount of 5 parts by mass per 100 parts by mass of the polystyrenesulfonic acid.

[Evaluation]

<Measurement of Proton Conductivity>

A cell for measuring conductivity was installed in a bath of a small environmental tester (model: SH-242, manufactured by Espec Corp.), and using an impedance analyzer (model: 4194A, manufactured by YHP Corp.), a measurement of a characteristic impedance was performed. The measurement was performed at a temperature described in Tables 1 to 4 or FIG. 1, under no humidification, and at a frequency sweep range of from 100 Hz to 1 MHz. The real component of the point where the capacitance component of Nyquist plot of the characteristic impedance is minimized was determined as a measurement value (Rm), the impedance characteristic at the time of short-circuit of the measurement cable was as (Ru). Further, using the membrane thickness of the sample (d) and the electrode area (S), the conductivity (σ) (unit: S/cm) in the membrane thickness direction was determined according to the following formula.

$$\sigma = d / \{(Rm - Ru) \times S\}$$

<Durability>

The proton conductive membranes obtained in Examples 1, 2, 7 to 19 were visually observed in the case of heating to 110° C. and the case of storing at room temperature for a long time, respectively. The durability of the proton conductive membranes were evaluated by the following evaluation criteria.

(Evaluation Criteria for Durability)

A: The membrane does not disintegrate after heating or after storage at room temperature for a long time.

B: Although the membrane does not disintegrate after storage at room temperature for a short time, the membrane disintegrates after heating or after storage at room temperature for a long time.

C: The membrane disintegrates after storage at room temperature for a short time.

TABLE 1

|  | Proton-source-polymer | Proton-channel-polymer | Mass ratio (Proton-source-polymer/ Proton-channel-polymer) | Membrane thickness (mm) | $\sigma$ (Scm$^{-1}$) (100 kHz, 25° C.) |
|---|---|---|---|---|---|
| Comparative Example 1 | RSS | — | 100/0 | 0.64 | $8.0 \times 10^{-3}$ |
| Example 1 | PSS | Poly(DADBF) | 100/3 | 0.49 | $1.9 \times 10^{-2}$ (100 kHz, 25° C.) $2.3 \times 10^{-1}$ (100 kHz, 80° C.) $2.7 \times 10^{-1}$ (100 kHz, 145° C.) |
| Example 2 | PSS | Poly(DADBF) | 100/10 | 0.47 | $6.1 \times 10^{-2}$ |
| Example 3 | PSS | Poly(2VPy)500 | 100/10 | 1.24 | $2.6 \times 10^{-2}$ |
| Example 4 | PSS | Poly(2VPy)2000 | 100/10 | 1.34 | $1.9 \times 10^{-2}$ |
| Example 5 | PSS | Poly(Phen)1000 | 100/2 | 1.99 | $6.6 \times 10^{-2}$ |
| Comparative Example 2 | Nafion | — | 100/0 | 0.31 | $5.0 \times 10^{-3}$ |
| Example 6 | Nafion | Poly(Phen)10000 | 100/10 | 0.54 | $3.4 \times 10^{-2}$ |

TABLE 2

|  | Proton-source-polymer | Proton-channel-polymer 1 | Proton-channel-polymer 2 | Mass ratio (Proton-source-polymer/Proton-channel-polymer 1/ Proton-channel-polymer 2) | Membrane thickness (mm) | $\sigma$ (Scm$^{-1}$) (100 kHz, 25° C.) | Durability |
|---|---|---|---|---|---|---|---|
| Example 1 | PSS | Poly(DADBF) | — | 100/3/0 | 0.49 | $1.9 \times 10^{-2}$ | B |
| Example 2 | PSS | Poly(DADBF) | — | 100/10/0 | 0.47 | $6.1 \times 10^{-2}$ | B |
| Example 7 | PSS | Poly(DADBF) | PEO600 | 100/3/10 | 1.31 | $4.4 \times 10^{-2}$ | A |
| Example 8 | PSS | Poly(DADBF) | PEO3000 | 100/3/10 | 0.70 | $2.1 \times 10^{-2}$ | A |
| Example 9 | PSS | Poly(DADBF) | PEO46000 | 100/3/10 | 0.59 | $1.5 \times 10^{-2}$ | A |
| Example 10 | PSS | Poly(DADBF) | PEO510000 | 100/3/10 | 0.59 | $3.4 \times 10^{-2}$ | A |

TABLE 3

|  | Proton-source-polymer | | Proton-channel-polymer | Mass ratio (Main skeleton/ Crosslinked structure/ Proton-channel-polymer) | Membrane thickness (mm) | $\sigma$ (Scm$^{-1}$) (100 kHz, 25° C.) | Durability |
|---|---|---|---|---|---|---|---|
|  | Main skeleton | Crosslinked structure |  |  |  |  |  |
| Example 11 | PSS | DAH | — | 100/10/0 | 0.75 | $5.3 \times 10^{-2}$ | A |
| Example 12 | PSS | DAH | — | 100/5/0 | 0.31 | $3.2 \times 10^{-2}$ | A |
| Example 13 | PSS | DAH | — | 100/3/0 | 0.38 | $1.2 \times 10^{-2}$ | A |
| Example 14 | PSS | DAH | Poly(DADBF) | 100/3/3 | 0.43 | $2.4 \times 10^{-2}$ | B |
| Example 15 | PSS | DAE | — | 100/5/0 | 0.42 | $1.2 \times 10^{-2}$ | A |
| Example 16 | PSS | DAE | — | 100/3/0 | 0.43 | $4.6 \times 10^{-2}$ | A |
| Example 17 | PSS | DAE | Poly(DADBF) | 100/3/3 | 0.32 | $1.6 \times 10^{-2}$ | B |

TABLE 4

|  | Proton-source-polymer | | Mass ratio (Main skeleton/ Crosslinked structure) | Membrane thickness (mm) | $\sigma$(Scm$^{-1}$) (100 kHz) | | Durability |
|---|---|---|---|---|---|---|---|
|  | Main skeleton | Crosslinked structure |  |  | 25° C. | 110° C. |  |
| Example 18 | PSS | MBAA | 100/1 | 1.00 | $1.8 \times 10^{-2}$ | $6.5 \times 10^{-2}$ | A |

TABLE 4-continued

| | Proton-source-polymer | | Mass ratio (Main skeleton/ Crosslinked structure) | Membrane thickness (mm) | σ(Scm⁻¹) (100 kHz) | | Durability |
|---|---|---|---|---|---|---|---|
| | Main skeleton | Crosslinked structure | | | 25° C. | 110° C. | |
| Example 19 | PSS | MBAA | 100/5 | 0.74 | $1.6 \times 10^{-2}$ | — | A |

Abbreviations in Tables 1 to 4 are as follows.
PSS: Polystyrene sulfonic acid (Mn 7000)
Nafion: Nafion (registered trademark) (product number: NR212, manufactured by DuPont Co., Ltd.)
Poly(DADBF): Poly(4,5-diazadibenzoflubene) (Mn 1600)
Poly(2VPy)500: Poly(2-vinylpyridine) (Mn 500)
Poly(Phen)1000: Poly(1,10-phenanthroline) (Mn 1000)
Poly(Phen)10000: Poly(1,10-phenanthroline) (Mn 10000)
PEO600: Polyethylene oxide (Mn 600)
PEO3000: Polyethylene oxide (Mn 3000)
PEO46000: Polyethylene oxide (Mn 46000)
PEO510000: Polyethylene oxide (Mn 510000)
DAH: 1,6-Diaminohexane
DAE: 1,2-Diaminoethane
MBAA: N,N'-Methylenebisacrylamide <Water Resistance>

The proton conductive membrane obtained in Example 18 was evaluated for water resistance by the following methods A and B.

(Method A)

The proton conductive membrane obtained in Example 18 was cut out for about 100 mg to prepare a sample. The sample weighed 92.85 mg as a result of weighing. The sample was immersed in water at 80° C. for 1 hour, air-dried for 4 days, and vacuum dried for another 24 hours, and then, the sample weighed 90.14 mg as a result of weighing. The weight loss was 2.9% (2.71 mg).

The weight loss is sufficiently small compared with a conventional proton conductive membrane. It was presumed that the weight loss was an error based on an insufficient drying of the measurement sample or a mechanical loss or the like caused by a small scale experiment. Therefore, it was clarified that the proton conductive membrane obtained in Example 18 had high water resistance and did not elute into water.

(Method B)

The proton conductive membrane obtained in Example 18 was cut out to prepare a sample. The sample was immersed in water at room temperature (25° C.) for 24 hours to swell, and the sample after swelling weighed 6160 mg as a result of weighing. The sample after the swelling was further immersed in water for 1 hour at 80° C., and then the sample weighed 6950 mg as a result of weighing. The weight increase was 12.8% (790 mg).

It was presumed that the weight increase was due to insufficient swelling of the sample before the sample was immersed in water at 80° C. Therefore, it was clarified that the proton conductive membrane obtained in Example 18 had high water resistance and did not elute into water even after being sufficiently moistened with water and swollen.

Further, the measurement result of the proton conductivity in the temperature range of from −20° C. to 150° C. and under no humidification of 5% RH of the proton conductive membrane obtained in Example 18, and the measurement result of the proton conductivity in the temperature range of from −20° C. to 150° C. and under no humidification of 5% RH of the proton conductive membrane obtained in Comparative Example 2, are shown in FIG. 1. In FIG. 1, the horizontal axis shows 1000/T (T is a measurement temperature (K)), and the vertical axis shows the proton conductivity (S/cm).

The proton conductive membranes obtained in Examples 1 to 10 shown in Tables 1 and 2 are proton conductive materials of the first embodiment of the present disclosure. They contain a polystyrene sulfonic acid or Nafion (registered trademark) as the proton-source-polymer, and contain a poly(4,5-diazadibenzofulvene), a poly(2-vinylpyridine) or a poly(1,10-phenanthroline) as the proton-channel-polymer. Since these proton-channel-polymers have a proton channel containing an aromatic ring which can easily form a stacked structure by π-π interactions, the proton conductive membranes obtained in Examples 1 to 10 have a structure in which at least a part of the proton-channel-polymer is stacked by π-π interactions.

The proton conductive membranes obtained in Examples 1 to 10, which were proton conductive materials of the first embodiment of the present disclosure, had high proton conductivity of 10 mS/cm or more under no humidification at 25° C. The proton conductivity of them was improved compared with the polystyrene sulfonic acid membrane of Comparative Example 1 and the Nafion membrane of Comparative Example 2.

In addition, the proton conductive membranes obtained in Examples 1 to 10 were membranes which did not elute into water because the proton source groups and the proton channels were covalently bonded to the polymer. Accordingly, the proton conductive membranes obtained in Examples 1 to 10 did not contain components eluting into water.

In addition, in Example 1 shown in Table 1, it was shown that the proton conductive material of the first embodiment of the present disclosure containing a styrene sulfonic acid-based polymer as the proton-source-polymer and containing a poly(4,5-diazadibenzofulvene) as the proton-channel-polymer had extremely high proton conductivity under no humidification even under high temperature.

From the comparison of Examples 1 to 2 and Examples 7 to 10 shown in Table 2, it was shown that a proton conductive material of the first embodiment of the present disclosure further containing polyethylene oxide as the proton-channel-polymer, improved durability while suppressing a decrease in proton conductivity.

The proton conductive membranes obtained in Examples 11 to 19 shown in Table 3 and Table 4 are proton conductive materials of the second embodiment of the present disclosure. They have a proton-source-crosslinked-polymer in which a main skeleton derived from a polystyrene sulfonic acid is contained as the main skeleton containing a proton source group and an aromatic ring, and a crosslinked structure derived from 1,6-diaminohexane, 1,2-diaminoethane or N,N'-methylenebisacrylamide is contained as the crosslinked structure containing a proton channel, and in which at least a part of the proton-source-crosslinked-polymer has a stacked structure formed by $\pi$-$\pi$ interactions.

The proton conductive membranes obtained in Examples 11 to 19, which were proton conductive materials of the second embodiment of the present disclosure, also had high proton conductivity of 10 mS/cm or more under no humidification at 25° C. The proton conductivity of them was improved compared with the polystyrene sulfonic acid membrane of Comparative Example 1 and the Nafion membrane of Comparative Example 2.

In addition, in the proton conductive membranes obtained in Examples 11 to 19, the proton source groups were covalently bonded to the main skeleton, and the proton channels were covalently bonded to the crosslinked structure or the proton-channel-polymer, and the crosslinked structures were chemically bonded to the main skeleton. Accordingly, the proton source groups and the proton channels did not elute into water, and the proton conductive membranes obtained in Examples 11 to 19 did not contain a component eluting into water.

In addition, the proton conductive membranes obtained in Examples 11 to 19 were also excellent in durability while having high proton conductivity.

In Example 18 shown in Table 4, it was shown that the proton conductive material of the second embodiment of the present disclosure, which contained a proton-source-crosslinked-polymer having a main skeleton derived from a styrene sulfonic acid-based polymer and having a crosslinked structure derived from N,N'-methylenebisacrylamide, had high proton conductivity under no humidification even at a high temperature and also had excellent durability. In addition, it was confirmed that there was almost no change in the proton conductive membrane obtained in Example 18 even after storage at room temperature for three days. Hence, aging deterioration of the membrane was suppressed.

Further, as a result of performing the above-mentioned evaluation of water resistance on the proton conductive membrane obtained in Example 18, it was shown that it had high water resistance.

Further, from the results shown in FIG. 1, it was shown that the proton conductive membrane obtained in Example 18 had high proton conductivity under no humidification in a wide temperature range.

Since the comparative conductive membrane of Comparative Example 2 was a Nafion membrane, proton conductivity was insufficient under no humidification. In the comparative conductive membrane of Comparative Example 2, as shown in FIG. 1, the higher the temperature, the higher the proton conductivity was. The reason of this was presumed that the glass transition temperature of the Nafion membrane of Comparative Example 2 was 109° C. Accordingly, the molecular mobility was improved at higher temperature. It was also possible that the apparent proton conductivity increased because the membrane thickness decreased and the resistance decreased at a higher temperature, in addition to the possibility that a small amount of moisture had not been removed. In the measurement cell subjected to the surface pressure, there was a possibility that the membrane was softened at a high temperature and the membrane thickness was reduced.

The proton conductive material of the present disclosure is thus a proton conductive material which has high proton conductivity even under no humidification and does not elute into water, and can be suitably used as an electrolyte material of a catalyst layer used in a fuel cell or a solid electrolyte membrane used in a fuel cell.

The invention claimed is:

1. A proton conductive material comprising a proton source group-containing polymer and a proton channel-containing polymer,
wherein at least one selected from the group consisting of the proton source group-containing polymer and the proton channel-containing polymer is a polymer containing an aromatic ring, and
wherein at least a part of the polymer containing the aromatic ring has a stacked structure formed by $\pi$-$\pi$ interactions;
wherein the proton source group-containing polymer comprises a styrenesulfonic acid-based polymer, and
wherein the proton channel-containing polymer comprises a poly(4,5-diazadibenzofulvene) having a number average molecular weight Mn of from 1000 to 2000, in an amount of from 1 part by mass to 15 parts by mass per 100 parts by mass of the styrenesulfonic acid-based polymer.

2. The proton conductive material according to claim 1, wherein the material further comprises a polyethylene oxide as the proton channel-containing polymer.

3. A proton conductive material comprising a proton source group-containing polymer and a proton channel-containing polymer,
wherein at least one selected from the group consisting of the proton source group-containing polymer and the proton channel-containing polymer is a polymer containing an aromatic ring, and
wherein at least a part of the polymer containing the aromatic ring has a stacked structure formed by $\pi$-$\pi$ interactions;
wherein a styrenesulfonic acid-based polymer is contained as the proton source group-containing polymer, and
as the proton channel-containing polymer, a poly(4,5-diazadibenzofulvene) having a number average molecular weight Mn of from 1000 to 2000 is contained in an amount of from 1 part by mass to 5 parts by mass per 100 parts by mass of the styrenesulfonic acid-based polymer, and a polyethylene oxide having a number average molecular weight Mn of from 600 to 510000 is contained in an amount of from 8 parts by mass to 12 parts by mass per 100 parts by mass of the styrenesulfonic acid-based polymer.

* * * * *